(12) United States Patent
Koneru et al.

(10) Patent No.: US 12,439,476 B2
(45) Date of Patent: Oct. 7, 2025

(54) SYSTEMS AND METHODS FOR USING NATURAL LANGUAGE PROCESSING IN TWO WAY RADIO COMMUNICATIONS

(71) Applicant: Kore.ai., Inc., Orlando, FL (US)

(72) Inventors: Rajkumar Koneru, Windermere, FL (US); Prasanna Kumar Arikala Gunalan, Hyderabad (IN); Timothy Loewenstein, II, Elk River, MN (US); Gopinath Polavarapu, Vijayawada (IN)

(73) Assignee: Kore.ai, Inc., Orlando, FL (US)

( * ) Notice: Subject to any disclaimer, the term of this patent is extended or adjusted under 35 U.S.C. 154(b) by 443 days.

(21) Appl. No.: 17/993,520

(22) Filed: Nov. 23, 2022

(65) Prior Publication Data
US 2024/0172331 A1    May 23, 2024

(51) Int. Cl.
*G10L 15/22* (2006.01)
*G10L 15/18* (2013.01)
*G10L 15/30* (2013.01)
*H04W 76/45* (2018.01)

(52) U.S. Cl.
CPC ......... *H04W 76/45* (2018.02); *G10L 15/1815* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 10,372,755 B2 | 8/2019 | Blanco | |
| 10,530,465 B2 | 1/2020 | Pinder et al. | |
| 2003/0138080 A1* | 7/2003 | Nelson | H04L 12/66 379/88.16 |
| 2009/0257565 A1* | 10/2009 | Nelson | H04L 12/66 379/157 |
| 2018/0181656 A1 | 6/2018 | Proctor | |
| 2020/0068374 A1* | 2/2020 | Mehta | H04W 4/08 |

OTHER PUBLICATIONS

Zacks Equity Research (Jan. 17, 2022) Motorola (MSI) unveils curve Wi-Fi Enhanced Business Radio, Nasdaq. Available at: https://www.nasdaq.com/articles/motorola-msi-unveils-curve-wi-fi-enhanced-business-radio (Accessed: Nov. 25, 2022).

* cited by examiner

*Primary Examiner* — Idowu O Osifade
(74) *Attorney, Agent, or Firm* — Troutman Pepper Locke LLP

(57) ABSTRACT

A virtual assistant server receives from a network communication device, message data provided by a user operating a first two-way radio via a first channel. Subsequently, the virtual assistant server generates response data to the message data and determines a response channel based on the message data. The virtual assistant server establishes a communication session with a network communication device based on the determined response channel and transmits the response data to the network communication device via the established communication session.

14 Claims, 6 Drawing Sheets

| Message classification | Response channel |
|---|---|
| Question | First channel |
| Task assignment | Second channel |
| Broadcast | Second channel |

FIG. 4A

| Intent classification | Response channel |
|---|---|
| Intent1 | First channel |
| Intent2 | Second channel |
| Intent3 | Second channel |
| Intent4 | First channel |

FIG. 4B

| Invocation name | Response channel |
|---|---|
| Admin | First channel |
| POS | Second channel |
| Customer care | Third channel |

FIG. 4C

SYSTEMS AND METHODS FOR USING NATURAL LANGUAGE PROCESSING IN TWO WAY RADIO COMMUNICATIONS

FIELD

This technology generally relates to two-way radio communications, and more particularly to methods, systems, and computer-readable media for using natural language processing in two-way radio communications.

BACKGROUND

Existing two-way radio communication systems are used in multiple domains, such as public safety, hospitality, shopping malls, floor management, security services, or the like. Two-way radios, popularly called walkie-talkies, enable exchange of messages over multiple channels using half-duplex communication.

The channels may be used by talk-groups of users for communication. In one example, a channel 1 may be used by a talk-group of the police department and a channel 2 may be used by a talk-group of the fire department. A police officer using a first two-way radio may rotate a knob on the two-way radio to select channel 1 and press a push-to-talk button to transmit a message. The transmitted message is broadcast on channel 1 and will be audible to all the users of the police talk-group listening to channel 1.

The communications are heard by many users and messages may often be lost in chatter and not reach the intended recipients. In one example, in a public safety scenario, important SOS messages, such as requests to render first aid or cardiopulmonary resuscitation, may be lost in chatter posing a safety risk. In another example, messages to clean a hotel room may be missed by the housekeeping team resulting in check-in delays and bad customer service.

The users need formal training for radio communication, and it takes time to develop an "ear" for the radio. Moreover, in noisy environments, user messages transmitted using the two-way radios may not be clearly heard by the other users. As a result, users may inaccurately dispatch teams or update applications causing system breakdowns, service delays, and in some cases loss of human life.

New two-radio systems use advanced communication and IT systems to overcome some of these disadvantages. In one example, some two-way radio systems use broadband, Wi-Fi connectivity to improve connectivity and touch screen interfaces to improve user experience. However, such systems require a paradigm shift to a new infrastructure and purchase of specialized two-way radios. This involves heavy capital expenditure and may not be affordable for a large segment of the customers.

Hence, there is a need to provide affordable two-way radio communication systems which facilitate automated workflows and task management.

SUMMARY

In an example, the present disclosure relates to a method for using natural language processing in two-way radio communications. The method comprises determining a selection of one of a plurality of response channels in a two-way radio communication system based on one of a plurality of types of classifications of message data received from a network communication device regardless of the one of the response channels the message data was received. Further response data to the received message data is generated, and a communication session with the network communication device based on the determined one of the plurality of response channels is established. Further, the generated response data to the network communication device via the established communication session is transmitted.

In another example, the present disclosure relates to a virtual assistant server comprising a processor and a memory. The memory coupled to the processor which is configured to execute programmed instructions stored in the memory to determine a selection of one of a plurality of response channels in a two-way radio communication system based on one of a plurality of types of classifications of message data received from a network communication device regardless of the one of the response channels the message data was received. Further response data to the received message data is generated, and a communication session with the network communication device based on the determined one of the plurality of response channels is established. Further, the generated response data to the network communication device via the established communication session is transmitted.

In another example, the present disclosure relates to a non-transitory computer readable storage medium having stored thereon instructions which when executed by a processor, causes the processor to determine a selection of one of a plurality of response channels in a two-way radio communication system based on one of a plurality of types of classifications of message data received from a network communication device regardless of the one of the response channels the message data was received. Further response data to the received message data is generated, and a communication session with the network communication device based on the determined one of the plurality of response channels is established. Further, the generated response data to the network communication device via the established communication session is transmitted.

BRIEF DESCRIPTION OF THE DRAWINGS

FIG. 4A is a table of an example of a message classification-response channel mapping.

FIG. 4B is a table of an example of an intent classification-response channel mapping.

FIG. 4C is a table of an example of an invocation name-response channel mapping.

DETAILED DESCRIPTION

Figure 1:
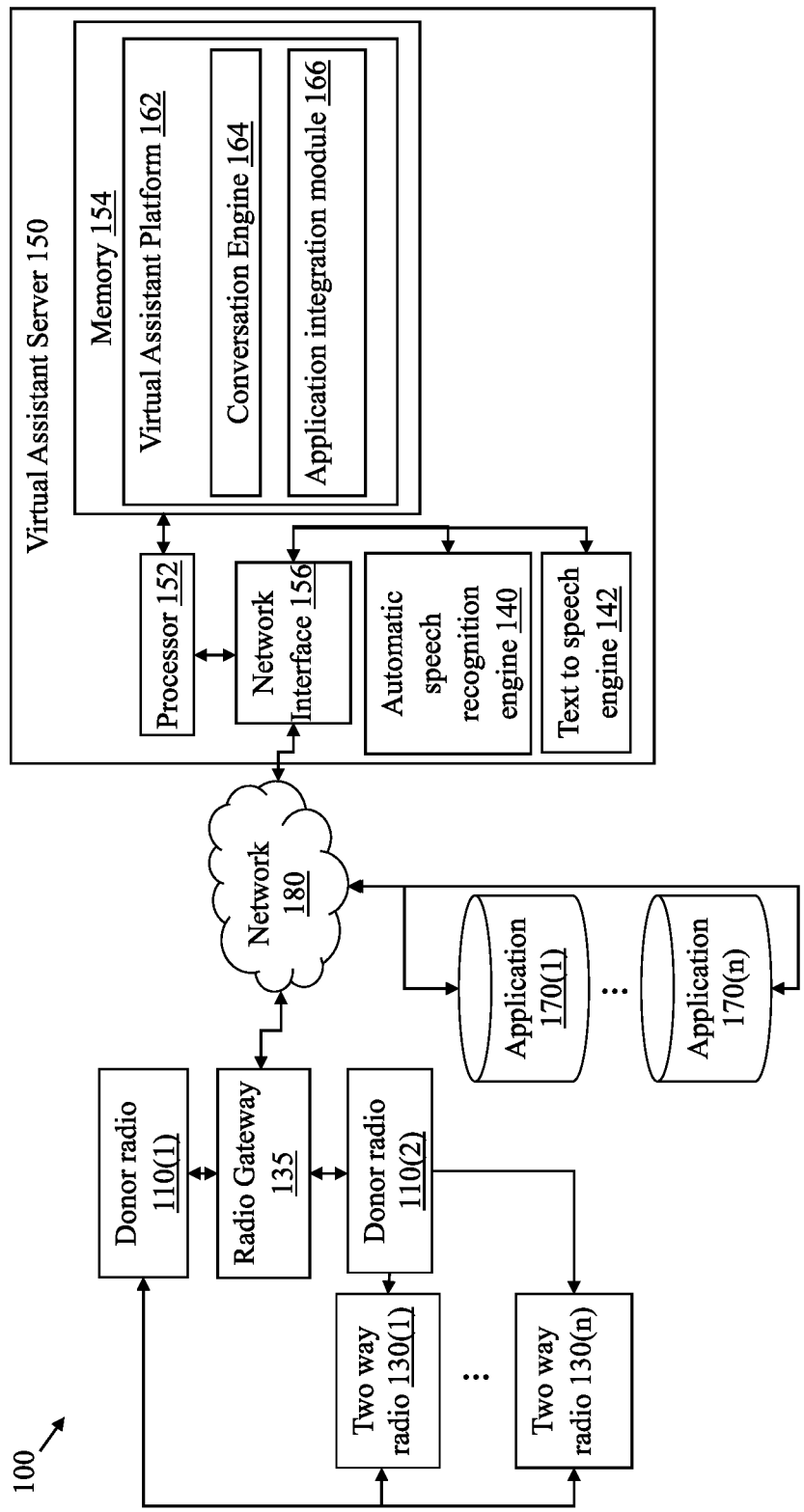
FIG. 1 is a block diagram of an exemplary communication environment with an example of a virtual assistant server configured to manage channels for messaging in two-way radio communications with natural language processing.

Examples of the present disclosure relate to two-way radio communications, more particularly, to one or more components, systems, computer-readable media, and methods for using natural language processing in two-way radio communications. A communications environment enables a plurality of two-way radios to communicate with each other and the plurality of radios to communicate with a virtual assistant server. Users of the plurality of two-way radios may select a channel and listen to the messages transmitted in the channel. Also, the users of the plurality of two-way radios may use another channel to provide a natural language input. Network communication devices, such as a gateway, receive the natural language input and transmits the natural language input to the virtual assistant server. The virtual assistant server may provide a response to the natural language input that is provided to the users in another channel via the gateway.

In one example, when the communication environment is implemented for a public safety system, the channels of radio communication may be configured for usage by police, fire, medical teams. Channel 1 may be configured for usage by police personnel, channel 2 may be configured for usage by the fire team, and channel 3 may be configured for usage by the medical team, and a channel 4 may be dedicated for all the teams to communicate with the virtual assistant server 150. In one example, a police officer may select channel 1 on one of the two-way radios 130(1)-130(n) to broadcast a message—"suspicious person identified on Cherokee street."

In another example, the police officer on one of the two-way radios 130(1)-130(n) may select channel 4 and send a message to the virtual assistant server 150—"fire at 135 Cherokee street, dispatch the closest fire unit." In this example, the virtual assistant server 150 may identify what is the closest one of a plurality of fire units, e.g. fire truck 51, and then generate the response—"fire at 135 Cherokee street, fire truck 51 head out" to be sent out, Next, the virtual assistant server 150 may utilize natural language processing to determine that this response is for the fire usage team and should be transmitted by the gateway 135 in channel 2 and thus establishes the communication session with gateway 135 accordingly. The gateway 135, via the donor radio 110(2), may broadcast the response over channel 2. It may be understood that the virtual assistant server 150 may access one or more applications 170(1)-170(n) to identify the closest fire unit to Cherokee street. In this manner, the communication environment may leverage the natural language processing, workflows, or other automation capabilities of the virtual assistant server 150 to provide an enhanced and an efficient two-way radio solution.

Referring to FIG. 1, a block diagram of an exemplary communication environment 100 with the virtual assistant server 150 configured to manage channels for messaging in two-way radio communications with natural language processing. In this example, the environment 100 includes: a plurality of two-way radios 130(1)-130(n), a radio gateway 135, a donor radio 110(1), a donor radio 110(2), a virtual assistant server 150, a plurality of applications 170(1)-170(n), and a network 180, although the environment 100 may include other types and numbers of systems, devices, components, and/or elements and in other topologies and deployments. While not shown, the exemplary environment 100 may include additional network components, such as repeaters, gateways, routers, switches, and other devices, which are well known to those of ordinary skill in the art and thus will not be described here. The components illustrated in the environment 100 may be physically or communicatively coupled with each other.

The plurality of two-way radios 130(1)-130(n) are handheld radio devices carried by users to communicate tasks, situations, actions with their teams or with the virtual assistant server 150 via the radio gateway 135. The plurality of two-way radios 130(1)-130(n) communicate with each other over radio frequencies. The plurality of two-way radios 130(1)-130(n) have controls including a channel selector and a push to talk (PTT) button, although other types and/or numbers of controls may be provided in other configurations. The channel selector is used to select a channel (e.g., a radio frequency) for communication and the PTT button is used to activate and deactivate the PTT operations. The plurality of two-way radios 130(1)-130(n) may include other controls to turn power on and off, to control volume, to transmit emergency signals, or the like. The users of the plurality of two-way radios 130(1)-130(n) may select one of a plurality of channels and listen to the messages transmitted on the selected one of the channels.

The plurality of two-way radios 130(1)-130(n) may also include a display and may connect to a Wi-Fi or a cellular network, although the radios may have other components and other manners for connecting. It may be understood that the plurality of two-way radios 130(1)-130(n) may include other types and/or numbers of functions, controls, or capabilities in other configurations. The plurality of two-way radios 130(1)-130(n) may engage in wireless communication with the donor radio 110(1) or the donor radio 110(2) in frequencies such as Ultra High Frequency (UHF), Very High Frequency (VHF), or the like.

The radio gateway 135 is a gateway to relay communications between the plurality of two radios 130(1)-130(n) and the virtual assistant server 150, although the radio gateway 135 may perform other types and/or numbers of functions in other configurations. The radio gateway 135 may be Radio-over-Internet-Protocol (RoIP) compliant, although other types and/or numbers of signal and information transmission methods may be used. RoIP uses Voice over Internet Protocol (VoIP) to transmit information over an IP (Internet Protocol) network. Session initiation protocol (SIP) is used to establish and disconnect VoIP calls and Real-time Protocol (RTP) is used for information exchange over the established SIP communication session. The radio gateway 135 may be SIP protocol compliant and SIP enabled. In one example, the radio gateway 135 may be coupled with a media server (not shown) or a Session Initiation Protocol (SIP) Private branch Exchange (PBX) (not shown). In another example, the radio gateway 135 may have the capabilities of the media server or the SIP PBX. The media server or the SIP PBX capabilities of the radio gateway 135 enable the plurality of two radios 130(1)-130(n) to communicate with the virtual assistant server 150. Although FIG. 1 illustrates one radio gateway 135, it may be understood that there may be one or more radio gateways 135 in the environment 100.

The radio gateway 135 converts information from one protocol to another, such as from analog audio to the IP and vice versa. In this example, the radio gateway system further comprises the donor radio 110(1) attached to an audio port of the radio gateway 135 to enable a first channel for communications and the donor radio 110(2) attached to the radio gateway 135 to another audio port to enable a second channel for communications, although the radio gateway system may have other numbers and/or types of other donor radios or other communication devices. In one example, the donor radio 110(1) and the donor radio 110(2) are attached to the radio gateway 135 via audio interface cables, although other manners for coupling may be used and/or the donor radios could be incorporated in the radio gateway 135 in other examples. The donor radio 110(1) and the donor radio 110(2) can communicate both with the plurality of two radios 130(1)-130(n) and the radio gateway 135. The donor radio 110(1) and the donor radio 110(2) may engage in wireless communication in frequencies such as Ultra High Frequency (UHF), Very High Frequency (VHF), or the like.

In this example, the donor radio 110(1) connected to the radio gateway 135 enables transmission of audio received over the first channel to the virtual assistant server 150 and transmission of audio received from the virtual assistant server 150 over the first channel. Hence, the donor radio 110(1) acts as a RX/TX interface to communicate with the virtual assistant server 150. This configuration allows the first channel to be used by the users of the plurality of two-way radios 130(1)-130(n) for half duplex communication with the virtual assistant server 150 via the radio gateway 135. The users of the plurality of radios 130(1)-130(n) may for example select the first channel from a plurality of channels to post queries, or place instructions to the virtual assistant server 150 in natural language.

In this example, the donor radio 110(2) connected to the radio gateway 135 enables transmission of audio provided by the virtual assistant server 150 over the second channel. Hence, the donor radio 110(2) acts as a TX interface for the virtual assistant server 150. This configuration allows the second channel to broadcast messages sent from the virtual assistant server 150 to the radio gateway 135. In this example, the second channel carries all the broadcast messages from the users of the plurality of radios 130(1)-130(n) and all the broadcast messages transmitted by the virtual assistant server 150.

The virtual assistant server 150 includes a processor 152, a memory 154, a network interface 156, an automatic speech recognition (ASR) engine 140, and a text to speech (TTS) engine 142, although the virtual assistant server 150 may include other types and/or numbers of components in other configurations. In addition, the virtual assistant server 150 may include an operating system (not shown). In one example, the virtual assistant server 150 and/or processes performed by the virtual assistant server 150 may be implemented using a networking environment (e.g., cloud computing environment). In one example, the capabilities of the virtual assistant server 150 may be offered as a service using the cloud computing environment. The virtual assistant server 150 uses SIP to establish a communication session with the radio gateway 135 and real time protocol (RTP) to exchange information with the radio gateway 135 over the communication session.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses or links may be used in other configurations.

The processor 152 of the virtual assistant server 150 may execute one or more computer-executable instructions stored in the memory 154 to implement the methods illustrated and described with reference to the examples herein, although the processor may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may include instructions corresponding to a virtual assistant platform 162, although other types and/or numbers of instructions in the form of programs, functions, methods, procedures, definitions, subroutines, or modules may be stored. Examples of the steps or functions performed when the programmed instructions stored in the memory 154 are executed are illustrated and described by way of the figures and description associated with the examples herein.

The virtual assistant platform 162 may be hosted and/or managed by the virtual assistant server 150 and may be accessible as a website, a web application, or a software-as-a-service (SaaS) application. Administrators of the virtual assistants may use the virtual assistant platform 162 to create and configure virtual assistants that are used to respond to natural language inputs. In one example, an administrator of the retail enterprise may create a retail virtual assistant using the virtual assistant platform 162 and train the retail virtual assistant to respond to natural language inputs from two-way radio operators at point-of-sale (POS) counters, service representatives, or store managers. Although not shown, the virtual assistant platform 162 of the virtual assistant server 150 may also receive natural language inputs sent from email, short messaging service (SMS), instant messengers, PSTN endpoints, or the like via the network 180.

The virtual assistant platform 162 comprises a conversation engine 164, and an application integration module 166, although the virtual assistant platform 162 may include other types and/or numbers of components in other configurations. The conversation engine 164 comprises natural language processing capabilities, although other types and/or numbers of capabilities in the form of programs, functions, methods, procedures, definitions, subroutines, or modules may be stored. The conversation engine 164 hosts and/or manages one or more virtual assistants created using the virtual assistant platform 162.

The virtual assistant platform 162 also determines a response channel for the message data. The determined response channel may be used by the virtual assistant server 150 to establish a communication session with the radio gateway 135 to transmit the response data. The virtual assistant platform 162 may use business rules, such as mapping information, or one or more artificial intelligence based models to determine the response channel.

The conversation engine 164 performs natural language understanding and natural language generation to conduct conversations. The conversation engine 164 may incorporate technologies or capabilities including—machine learning, semantic rules, component relationships, neural networks, rule-based engines, although other types and/or numbers of technologies may be incorporated in other configurations. The conversation engine 164 interprets natural language inputs to identify, one or more intents, one or more entity types or one or more entity values of the one or more entity types and generates one or more responses to the natural language inputs. The conversation engine 162 may use the training provided by the administrators to determine the one or more intents, the one or more entity types, or the one or more entity values of the one or more entity types from the natural language inputs (e.g., message data).

The administrators or developers may configure a virtual assistant with one or more intents. The administrators or developers may configure a dialog corresponding to each intent using a graphical user interface provided by the conversation engine 164. The administrators may configure the dialog by selecting one or more nodes and connecting the one or more nodes to provide a response to the message. The conversation engine 164 executes the nodes of the dialog when the conversation engine 164 detects the corresponding intent from the message to provide the response to the message. The one or more nodes may be entity nodes, message nodes, although there may be other types and/or numbers of nodes used to configure the dialog. The entity node is a node of the dialog configured to interpret an entity value of an entity type in the message data, although the entity node may be configured to perform other types and/or numbers of functions in other configurations. The message node is another node of the dialog configured to generate a response based on one or more entities identified in the message data, although the message node may be configured to perform other types and/or numbers of functions in other configurations.

The conversation engine 164 also creates and executes one or more language models to classify the natural language inputs into one or more intents configured for the virtual assistants based on the training added to the conversation engine 164. Also, the conversation engine 164 may use one or more pre-defined and/or custom-trained language models. The conversation engine 164 may use named entity recognition models to identify one or more entity types and one or more entity values of the one or more entity types in the message data, although other types and/or numbers of functions may be performed by the conversation engine 164 in other configurations. The one or more language models may be machine learning models, rule-based models, predictive models, neural network based models, semantic models, component relationship based models, or artificial intelligence based models, although there may be other types and/or numbers of language models in other configurations.

The conversation engine 164 may include code or algorithms for intent recognition, entity recognition, response channel determination, or the like, although other types and/or numbers of code or algorithms may be included in other configurations. The conversation engine 164 may comprise a finite state machine based, frame based, reinforcement learning based, or corpus based approaches for dialog management, although other types and/or numbers methods may be used in other configurations. The conversation engine 164 manages the context of a conversation between the users and the virtual assistants managed and hosted by the conversation engine 164. Further, the conversation engine 164 may manage digressions or interruptions provided by the users of the plurality of two-way radios 130(1)-130(n) during the conversations with the virtual assistant server 150. The conversation engine 164 may communicate with other components of the virtual assistant server 150 to orchestrate conversations.

The application integration module 166 connects the virtual assistant platform 162 with external components, such as the plurality of applications 170(1)-170(n) by way of example. In one example, the application integration module 166 may use application programming interfaces (APIs) to communicate with the plurality of applications 170(1)-170(n). The administrators of the virtual assistants may configure the APIs to query and retrieve data from the plurality of applications 170(1)-170(n).

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

In this example, the ASR engine 140 and TTS engine 142 enable the virtual assistant server 150 to handle voice communications. The ASR engine 140 converts voice messages received by the virtual assistant server 150 from the radio gateway 135 and converts the voice messages to text. The TTS engine 142 converts text messages and/or responses generated by the virtual assistant server 150 to voice messages which are transmitted by the virtual assistant server 150 to the radio gateway 135. In one example, the ASR engine 140 and the TTS engine 142 may be physically external or hosted externally to the virtual assistant server 150.

The plurality of applications 170(1)-170(n) may be one or more enterprise applications, such as customer relationship management applications, inventory applications, contact center applications, security applications, workforce optimization and/or management applications, public safety applications, databases, Software-as-a-Service (SaaS) applications, or the like by way of example. The plurality of applications 170(1)-170(n) may communicate with other systems using methods such as enterprise search or querying methods, web based methods, such as application programming interfaces (APIs), or the like by way of example. In one example, each of the plurality of applications 170(1)-170(n) may have a set of APIs to enable data access. The plurality of applications 170(1)-170(n) may store enterprise data or other data in JavaScript Object Notation (JSON), extensible markup language (XML), video, audio, image, or text formats, although the data may be stored in other types and/or numbers of formats.

The network 180 enables communication between the components of the environment 100. In one example, the radio gateway 135, the plurality of applications 170(1)-170(n), or other external systems may communicate with the virtual assistant server 150 via the network 100. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols.

Figure 2:
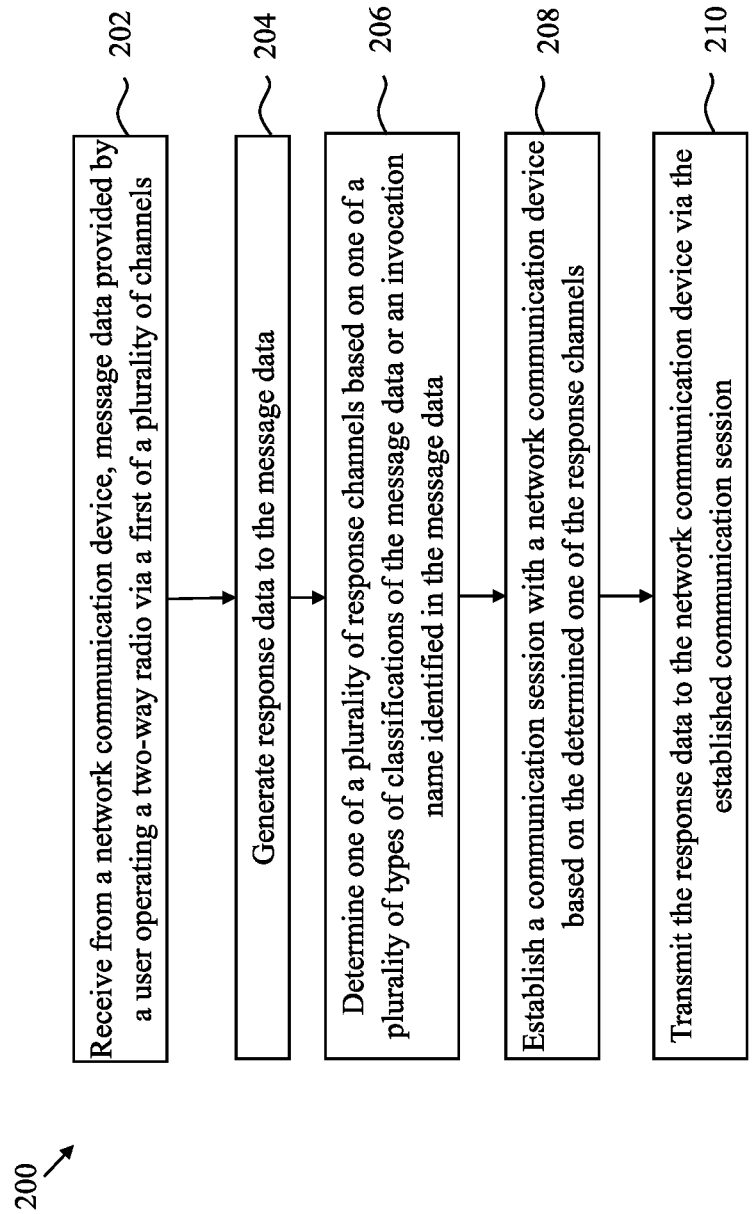
FIG. 2 is a flowchart of an exemplary method for managing messaging in two-way radio communications with natural language processing.

Referring to FIG. 2, a flowchart of an exemplary method 200 for managing messaging in two-way radio communications with natural language processing, such as managing a response channel after receiving message data in natural language from one of the plurality of two-way radios 130(1)-130(n) and providing a response to the message is illustrated. The exemplary method 200 may be managed by the virtual assistant server 150 which may interact with one or more other components of the environment 100 illustrated in FIG. 1 to perform one or more exemplary steps as described herein.

Referring back to FIG. 2, at step 202, the virtual assistant server 150 receives, from a network communication device such as the radio gateway 135, message data provided by a user operating a two-way radio 130(1) via a first of a plurality of channels. In this example, the user operating the two-way radio 130(1) selects the first channel using the channel selector and presses the PTT button to speak and provide the message data, although other manners for selecting or otherwise determining which of the channels to utilize may be used. The message data is transmitted to the radio gateway 135 via the donor radio 110(1).

When the radio gateway 135 receives an audio of the message data from the donor radio 110(1), the radio gateway 135 establishes a communication session with the virtual assistant server 150 and transmits the message data to the virtual assistant server 150. In this example, the radio gateway 135 uses a session initiation protocol (SIP) to establish the communication session with the virtual assistant server 150, although the radio gateway 135 uses other types and/or numbers of protocols in other configurations. The virtual assistant server 150 receives the message data from the radio gateway 135 and executes the ASR engine 140 which converts the audio of the message data to text. The ASR engine 140 provides the message data in the form of text to the virtual assistant platform 162.

At step 204, the conversation engine 164 of the virtual assistant server 150 generates response data to the message data based on an intent or a class of the message data, one or more entity types in the message data, or one or more entity values of the one or more entity types in the message data, although other manners for generating the response data may be used. In this example, the conversation engine 164 interprets the message data, and based on the interpretation determines an intent of the message data, one or more entity types, or one or more entity values of the one or more entity types from the message data. The conversation engine 164 may execute a dialog configured for the determined intent and use the one or more entity values of the one or more entity types to generate the response data in text mode. The TTS engine 142 converts the response data in the text mode to digitized voice.

In one example, the message data may be "need first aid at lobby three". In this example, the conversation engine 164 determines that the intent of the message data is—"send first aid", the entity type is a number, the entity value of the entity type is three. The conversation engine 164 executes the dialog corresponding to the intent—"send first aid". The dialog may include an entity node—"lobby number", with the entity type—number. The conversation engine 164 executes the dialog—"send first aid" and uses the entity value—three, provided in the message data during the execution. The conversation engine 164 subsequently executes a message node of the dialog—"send first aid", and uses the identified entity value to generate the response data—"send a first aid team to lobby three."

The conversation engine 164 may create a machine learning based classification model based on the training provided by the administrators to interpret and classify the message data. The machine learning based classification model may be trained using one or more sample sentences corresponding to each class or intent. In one example, in a hospitality virtual assistant hosted and managed by the conversation engine 164, the classification model may be trained to detect the class—"task assignment" using the sentences—"find the checked out rooms and ask the house keeping team to get them ready for check-in", "send first aid immediately to first floor lobby", "send an email to the vendor if the inventory trucks have not reached the stores". In a similar manner, the administrators may train other classes or intents. The conversation engine 164 may also identify one or more invocation names, channel identifiers, or the like from the message data.

At step 206, the virtual assistant server 150 determines one of a plurality of response channels based on one of a plurality of types of classifications of the message data or an invocation name identified in the message data. The virtual assistant server 150 may use one or more mappings stored in the memory 154, as illustrated in FIGS. 4A-4C to determine a response channel based on an intent of the message data, a class of the message data, or an invocation name in the message data. In these examples, the one of the plurality of response channels may be first channel, the second channel, or the third channel, although there may be other types and/or numbers of response channels in other configurations.

In one example, the one of the plurality of response channels may be determined by the virtual assistant server 150 based on a message classification of the received message data. More specifically in this particular example, the conversation engine 164 executed by the virtual assistant server 150 may be trained by the administrator to classify the received message data as a question, a task assignment or a broadcast and then identify one of the response channels based on a stored message type mapping table as illustrated in FIG. 4A, although other types and/or numbers of classifications may be used.

Referring more specifically to FIG. 4A, an exemplary message classification-response channel mapping table is shown. In this example, the conversation engine 164 of the virtual assistant server 150 may classify the message data received by the virtual assistant server 150 into three classes—question, task assignment, or a broadcast, although there may be other types and/or numbers of message classification and response channels in other configurations. The conversation engine 164 may provide this classification output to the virtual assistant server 150. The virtual assistant server 150 uses the message classification-response channel mapping to determine the response channel based on the message classification. For example, when the message is classified as a question, the response channel is determined as the first channel. It may be understood that the table in FIG. 4A is illustrated for simplicity and the message classification-response channel mapping may be stored in the form of key-value pairs, database tables, or the like.

As a further example, the one of the response channels may be the first channel when the conversation engine 164 executed by the virtual assistant server 150 determines that at least a part of the message data is a question, such as—"are there any coupon codes for appliances?", "how far are the nearest fire trucks?" by way of example. The response channel may be the second channel when the conversation engine 164 executed by the virtual assistant server 150 determines that at least a part of the message data is a task assignment or a broadcast message, such as—"fire at 135 Cherokee street, dispatch the closest fire unit" by way of example.

In another example, the conversation engine 164 executed by the virtual assistant server 150 may classify the received message data into one or more intents. Each of the one or more intents may be mapped to one of the response channels based on a stored intent mapping table configured by an administrator as illustrated in FIG. 4B. Accordingly in one example, the intent2 may be—"attend customer" which is mapped or correlated to the second response channel which is selected by the virtual assistant server 150.

Referring more specifically to FIG. 4B, an exemplary intent classification-response channel mapping table is shown. In this example, the conversation engine 164 of the virtual assistant server 150 may classify a received message data into one or more intents. In this example, the conversation engine 164 may classify the received message data into one of—intent 1, intent 2, intent 3, or intent 4, although there may be other types and/or numbers of intents and response channels in other configurations. The conversation engine 164 may provide this classification output to the virtual assistant server 150. The virtual assistant server 150 uses the intent classification-response channel mapping to determine the response channel based on the intent classification of the message. For example, when the message data is classified as intent 1, the response channel is determined as the first channel. The virtual assistant server 150 uses the determined response channel to establish a communication session with the radio gateway 135. It may be understood that the table in FIG. 4B is illustrated for simplicity and the intent classification-response channel mapping may be stored in the form of key-value pairs, database tables, or the like.

In further example, the conversation engine 164 executed by the virtual assistant server 150 may identify one of a plurality of invocation names provided in the message data. Each of the one or more invocation names may be mapped to one of the response channels based on a stored invocation name mapping table configured by an administrator as illustrated in FIG. 4C. Accordingly, in one example, the invocation name "Customer care" may be mapped or correlated to the third response channel which is selected by the virtual assistant server 150. Referring to FIG. 4C, an exemplary invocation name-response channel mapping table is shown. For example, the message data may be—"check the arrival time of the inventory trucks and broadcast it in the admin channel." In this example, the conversation engine 164 identifies the invocation name—admin, in the message data. The virtual assistant server 150 uses an invocation name-response channel mapping to determine the response channel. The virtual assistant server 150 uses the determined response channel to establish a communication session with the radio gateway 135. The administrator may configure invocation names for one or more available channels. For example, the invocation names may be: admin—first channel, POS—second channel, customer care—third channel, or the like. It may be understood that the table in FIG. 4C is illustrated for simplicity and the invocation name-response channel mapping may be stored in the form of key-value pairs, database tables, or the like.

Accordingly, in the examples illustrated and described herein, the one of the plurality of response channels may be determined by the virtual assistant server 150 based on class of the message data, one or more intents of the message data, or one or more invocation names in the message data, although there may be other types and/or numbers of methods to determine the one of the plurality of response channels in other configurations.

By way of further examples, the conversation engine 164 executed by the virtual assistant server 150 may identify one or more channel identifiers in the message data. More specifically, the message data may be—"check the arrival time of the inventory trucks and broadcast it on the first channel." In this example, the message data includes the channel identifier—first channel. The conversation engine 164 uses the determined channel identifier in the message data to determine the response channel. The virtual assistant server 150 uses the determined response channel to establish a communication session with the radio gateway 135.

At step 208, the virtual assistant server 150 establishes a communication session with the radio gateway 135 in this example (i.e., the network communication device) based on the determined one of the response channels. In one example, the virtual assistant server 150 may use a session initiation protocol to establish this communication session with radio gateway 135, although other types of protocols may be used. The virtual assistant server 150 may include the SIP URI of the first channel or the second channel in the SIP INVITE message based on the determined response channel. The SIP URI may be in the form of, for example, firstchannel@xxx.xx.xx.xxx:port number—which may be part of a request from the virtual assistant server 150 to the radio gateway 135 to establish the communication session and transmit the communications received in the communication session over the first channel. Subsequently, session establishment messages may be exchanged between the virtual assistant server 150 and the radio gateway 135 and the communication session may be established between the radio gateway 135 and the virtual assistant server 150.

At step 210, the virtual assistant server 150 transmits the response data to the message data to the radio gateway 135 (i.e., the network communication device) via the established communication session. In this example, the virtual assistant server 150 transmits the response data in the established communication session as digitized voice, by way of example using the RTP protocol, to the radio gateway 135, although other formats could be used. The radio gateway 135 transmits the received response data to the first channel via the donor radio 110(1) or to the second channel via the donor radio 110(2) based on the established communication session. The users of the one or more of the plurality of two-way radios 130(1)-130(n) tuned in to either the first channel or the second channel and may listen to the transmitted response data if transmitted on one of those channels.

In one example, when the user using the two-way radio 130(1) provides an input over the first channel—"are there any coupon codes available", the virtual assistant server 135 generates the response data—"no coupon codes are available" and establishes communication session of the radio gateway 135 based on the determined response channel—in this example the first channel. The virtual assistant server 135 transmits the response data via the communication session to the radio gateway 135. The radio gateway 135 transmits the first response over the first channel via the donor radio 110(1) which the user using the two-way radio 130(1) can listen to.

Figure 3A:
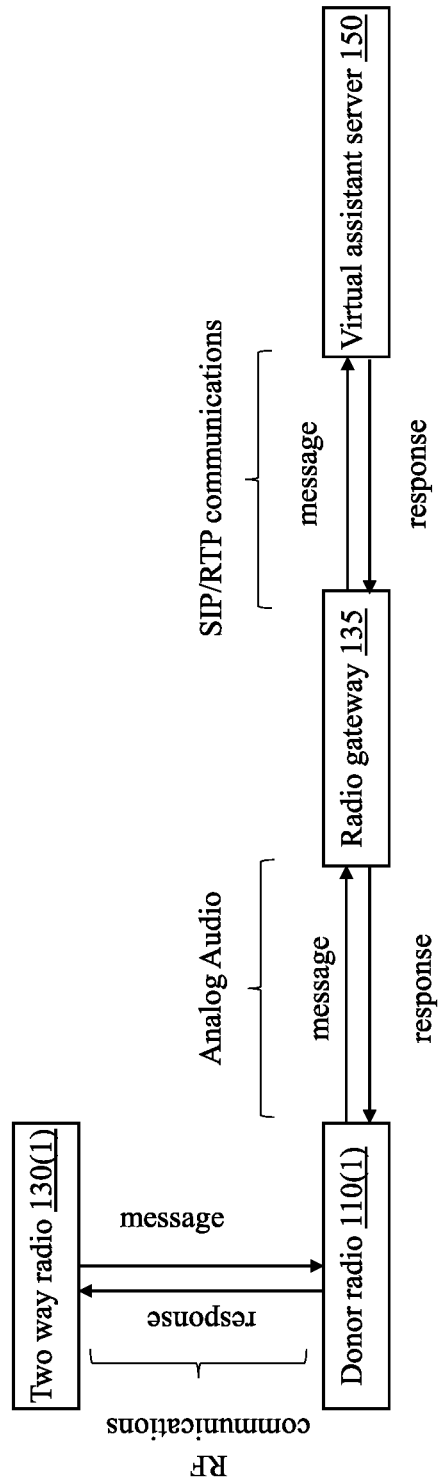
FIG. 3A is a functional flow diagram of an example of managing message data and response data in a two-way radio communication with natural language processing.

Referring to FIG. 3A, a functional flow diagram of an example of managing the message data and the response data in a two-way radio communication with natural language processing. The user operating the two-way radio 130(1) provides message data over the first channel. The message data is transmitted to the donor radio 110(1) using radio frequency communications. The donor radio 110(1) converts the message data to analog audio and transmits the analog audio of the message data to the radio gateway 135. The communications between the radio gateway 135 and the virtual assistant server 150 are transmitted using SIP/RTP protocol. The radio gateway 135 sends the message data to the virtual assistant server 150. The virtual assistant server 150 determines the response data, and the response channel as the first channel. Based on the determined response channel, the virtual assistant server 150 establishes a communication session with the radio gateway 135 and transmits the response data to the radio gateway 135 via the established communication session. In this example, the radio gateway 135 transmits the response data to the donor radio 110(1) as analog audio. The donor radio 110(1) transmits the analog audio of the response data over the first channel, and the user at the two-way radio 130(1) tuned to listen to the first channel can listen to the response data.

Figure 3B:
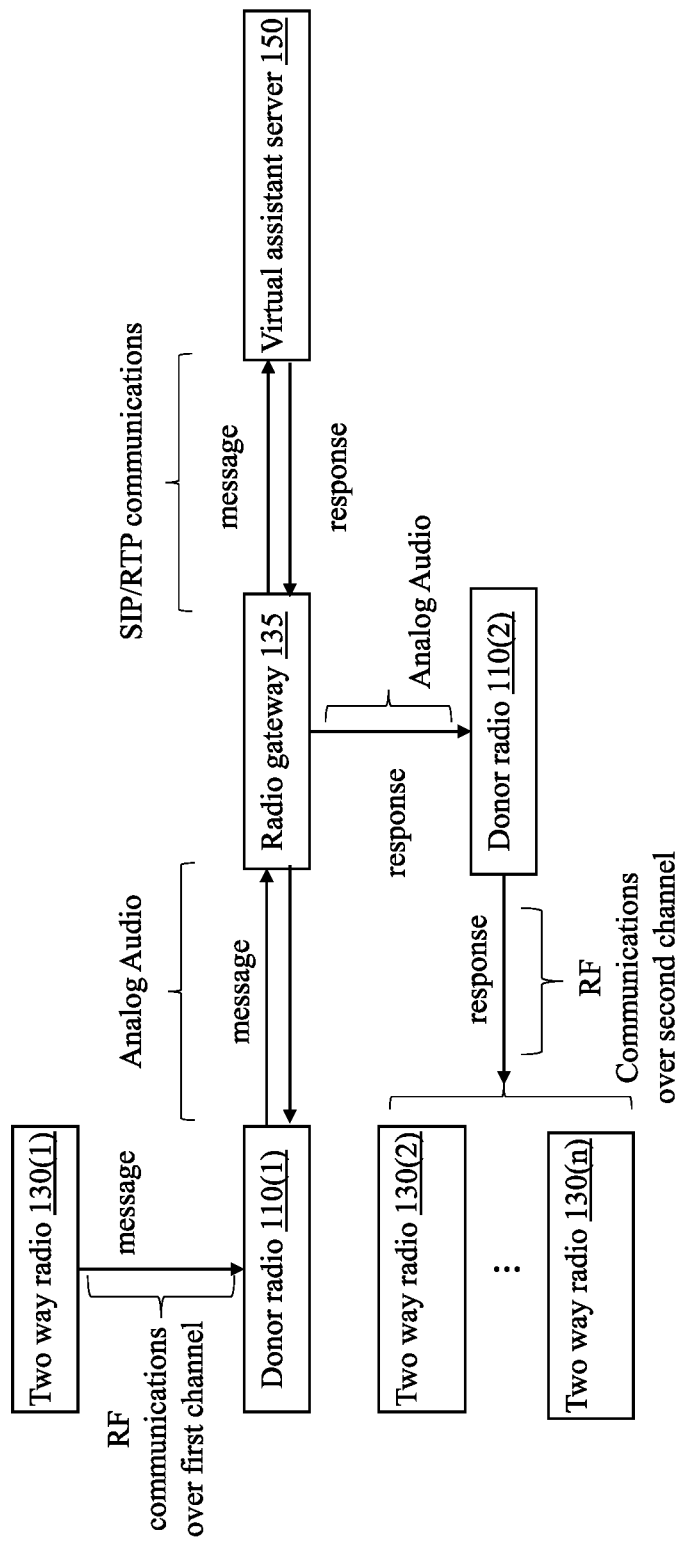
FIG. 3B is another functional flow diagram of an example of managing the message data and the response data in a two-way radio communication with natural language processing.

Referring to FIG. 3B, another functional flow diagram of an example of managing the message data and the response data in a two-way radio communication with natural language processing is shown. In this example the user operating the two-way radio 130(1) provides the message data over the first channel. The message data is transmitted to the donor radio 110(1) using radio frequency communications. The donor radio 110(1) converts the message data to analog audio and transmits the analog audio of the message data to the radio gateway 135. The communications between the radio gateway 135 and the virtual assistant server 150 are transmitted using SIP/RTP protocol. The radio gateway 135 sends the message data to the virtual assistant server 150. The virtual assistant server 150 determines the response data, and the response channel as the second channel. Based on the determined response channel, the virtual assistant server 150 establishes a communication session with the radio gateway 135 and transmits the response data to the radio gateway 135. In this example, the radio gateway 135 transmits the response data to the donor radio 110(2) as analog audio. The donor radio 110(2) transmits the analog audio of the response data over the second channel, and the users at the plurality of two-way radios 130(2)-130(n) tuned to listen to the second channel can listen to the response data.

For further illustration, the virtual assistant server 150 may select one or more response channels based on one or more of message classification, intent classification, or invocation names identified in the message data. The virtual assistant server 150 may select a first response channel using message classification of the message data, and a second response channel using an invocation name identified in the message data.

In one example, the message data is—"Replacement not dispatched. product code 1335 return issue with a customer at the counter. Check the inventory and notify the customer care team". The virtual assistant server 150 classifies this message as a task assignment and based on the message classification-response channel mapping illustrated in the FIG. 4A and stored in the memory 154, selects the second channel as the response channel. Further, the virtual assistant server 150 identifies invocation names of the customer care team and using the invocation name-response channel mapping shown in FIG. 4C selects the third channel as the response channel.

The virtual assistant server 150 may also generate channel specific response data. In the above example, when the message data received by the virtual assistant server 150 is—"Replacement not dispatched. Product code 1335 return issue with a customer at the counter. Check the inventory and notify the customer care team", the virtual assistant server 150 checks or queries the inventory application (e.g. application 170(n)) for the product 1335 and if the product 1335 is out of stock, a first response data is generated for the second channel as—"Product 1335 out of stock", a second response data is generated for the third channel as—"Replacement issue at the POS counter, product 1335 out of stock, send a customer care expert." In this example, the third channel may be a talkgroup of the customer care team. The virtual assistant server 150 transmits the first response data and the second response data to the radio gateway 135 for transmission over the second channel and the third channel.

In this example, the virtual assistant server 150 may identify the intent of the message as—"product return", the response channels as second channel and the third channel from the message data. The dialog of the intent—product return, may be executed and channel specific response data for each response channel may be generated during the execution. The virtual assistant server 150 may establish multiple communication sessions with the radio gateway 135 for each determined response channel to transmit the channel specific response data.

In another example, the virtual assistant server 150 may, based on the configuration added to the virtual assistant server 150 by the administrators, also send the response data via email, chat, social messengers, instant messengers, or other digital means to stakeholders.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for natural language processing comprising:
   determining, by a virtual assistant server, automatically a selection of one of a plurality of response channels in a two-way radio communication system based on an intent classification of message data received from a network communication device and an intent classification-response channel mapping;
   generating, by the virtual assistant server, response data to the received message data;
   establishing, by the virtual assistant server, a communication session with the network communication device based on the determined one of the plurality of response channels; and
   transmitting, by the virtual assistant server, the generated response data to the network communication device via the established communication session.

2. The method of claim 1, further comprising:
   determining, by a virtual assistant server, a selection of another one of the plurality of response channels in the two-way radio communication system based on an invocation name identified in the message data received from a network communication device;
   establishing, by the virtual assistant server, another communication session with the network communication device based on the determined another one of the plurality of response channels; and
   transmitting, by the virtual assistant server, generated response data to the network communication device via the established another communication session.

3. The method of claim 1, further comprising determining, by the virtual assistant server, a selection of another one of the plurality of response channels is based on a message classification of the message data and a message classification-response channel mapping.

4. The method of claim 1, further comprising determining, by the virtual assistant server, a selection of another one of the plurality of response channels is based on an invocation name identified in the message data and an invocation name-response channel mapping.

5. A virtual assistant server comprising:
   a processor; and
   a memory coupled to the processor which is configured to be capable of executing programmed instructions stored in the memory to:
   determine automatically a selection of one of a plurality of response channels in a two-way radio communication system based on an intent classification of message data received from a network communication device and an intent classification-response channel mapping;
   generate response data to the received message data;
   establish a communication session with the network communication device based on the determined one of the plurality of response channels; and
   transmit, by the virtual assistant server, generated response data to the network communication device via the established communication session.

6. The virtual assistant server of claim 5, wherein the processor is further configured to be capable of executing programmed instructions comprising and stored in the memory to:
   determine a selection of another one of the plurality of response channels in the two-way radio communication system based on an invocation name identified in the message data received from a network communication device;
   establish another communication session with the network communication device based on the determined another one of the plurality of response channels; and
   transmit generated response data to the network communication device via the established another communication session.

7. The virtual assistant server of claim 5, wherein the processor is further configured to be capable of executing programmed instructions comprising and stored in the memory to:
   determine a selection of another one of the plurality of response channels is based on a message classification of the message data and a message classification-response channel mapping.

8. The virtual assistant server of claim 5, wherein the processor is further configured to be capable of executing programmed instructions comprising and stored in the memory to:
   determine a selection of another one of the plurality of response channels is based on an invocation name identified in the message data and an invocation name-response channel mapping.

9. A non-transitory computer-readable medium having stored thereon instructions which when executed by a processor, causes the processor to:
   determine automatically a selection of one of a plurality of response channels in a two-way radio communication system based on an intent classification of message data received from a network communication device and an intent classification-response channel mapping;
   generate response data to the received message data;
   establish a communication session with the network communication device based on the determined one of the plurality of response channels; and
   transmit, by the virtual assistant server, generated response data to the network communication device via the established communication session.

10. The non-transitory computer-readable medium of claim 9, wherein the types of classifications comprise a message classification or an intent classification.

11. The non-transitory computer-readable medium of claim 10, wherein the selection of the one of the plurality of response channels is determined from the message classification based on a message classification-response channel mapping.

12. The non-transitory computer-readable medium of claim 9 wherein the stored instructions further comprise instructions to:

determine a selection of another one of the plurality of response channels in the two-way radio communication system based on an invocation name identified in the message data received from a network communication device;

establish another communication session with the network communication device based on the determined another one of the plurality of response channels; and transmit generated response data to the network communication device via the established another communication session.

13. The non-transitory computer-readable medium of claim 9, wherein the stored instructions further comprise instructions to determine a selection of another one of the plurality of response channels is based on a message classification of the message data and a message classification-response channel mapping.

14. The non-transitory computer-readable medium of claim 9, wherein the stored instructions further comprise instructions to determine a selection of another one of the plurality of response channels is based on an invocation name identified in the message data and an invocation name-response channel mapping.

* * * * *